(12) United States Patent
Cappelletti et al.

(10) Patent No.: US 8,208,518 B2
(45) Date of Patent: Jun. 26, 2012

(54) ELECTRONIC SYNCHRONOUS/ASYNCHRONOUS TRANSCEIVER DEVICE FOR POWER LINE COMMUNICATION NETWORKS

(75) Inventors: Roberto Cappelletti, Cornaredo (IT); Giuseppe Cantone, Siracusa (IT); Barbara Antonelli, Milan (IT); Antonello Castigliola, Mediglia (IT); Alessandro Lasciandare, Gignod (IT); Vincenzo Marano, Muggio (IT)

(73) Assignees: STMicroelectronics S.r.l., Agrate Brianza (IT); Dora S.p.A., Aosta (IT)

( * ) Notice: Subject to any disclaimer, the term of this patent is extended or adjusted under 35 U.S.C. 154(b) by 777 days.

(21) Appl. No.: 12/211,731

(22) Filed: Sep. 16, 2008

(65) Prior Publication Data
US 2009/0074041 A1 Mar. 19, 2009

Related U.S. Application Data

(63) Continuation-in-part of application No. PCT/IT2006/000166, filed on Mar. 17, 2006.

(51) Int. Cl.
*H04L 5/16* (2006.01)
*H04B 1/00* (2006.01)
*G06F 13/12* (2006.01)

(52) U.S. Cl. .................. 375/222; 375/145; 710/73
(58) Field of Classification Search .............. 375/222, 375/145; 710/73
See application file for complete search history.

(56) References Cited

U.S. PATENT DOCUMENTS

| | | | | |
|---|---|---|---|---|
| 4,537,131 | A * | 8/1985 | Saunders | 102/217 |
| 4,783,748 | A * | 11/1988 | Swarztrauber et al. | 702/62 |
| 5,452,344 | A * | 9/1995 | Larson | 340/538.11 |
| 5,878,369 | A * | 3/1999 | Rudow et al. | 701/470 |
| 6,396,392 | B1 * | 5/2002 | Abraham | 370/282 |
| 6,516,185 | B1 * | 2/2003 | MacNally | 455/234.1 |
| 2002/0010544 | A1 * | 1/2002 | Rudow et al. | 701/213 |
| 2004/0008996 | A1 * | 1/2004 | Aronson et al. | 398/202 |
| 2004/0076360 | A1 | 4/2004 | Chen et al. | |
| 2006/0291493 | A1 * | 12/2006 | Schley-May et al. | 370/401 |

OTHER PUBLICATIONS

STMicroelectronics ST7538, "Power Line FSK Transceiver," http://www.alldatasheet.com/datasheet-pdf/pdf/23813/STMICROELECTRONICS/ST7538.html, download date Dec. 8, 2005, 30 pages.
XP-002358186, "Power Line FSK Transceiver ST7538", STMicroelectronics, http://www.alldatasheet.com/datasheet-pdf/pdf/23813/STMICROELECTRONICS/ST7538.html, Sep. 2003.

* cited by examiner

*Primary Examiner* — David C. Payne
*Assistant Examiner* — Sarah Hassan
(74) *Attorney, Agent, or Firm* — Seed IP Law Group PLLC

(57) ABSTRACT

An electronic synchronous/asynchronous transceiver device for power line communication networks is integrated into a single chip and operates from a single supply voltage. The transceiver device includes: at least an internal register that is programmable through a synchronous serial interface; at least a line driver for a two-way network communication over power lines implemented by a single ended power amplifier with direct accessible input and output lines that is part of a tunable active filter for the transmission path; and at least a couple of linear regulators for powering with different voltage levels different kind of external controllers linked to the transceiver device.

22 Claims, 19 Drawing Sheets

ELECTRONIC SYNCHRONOUS/ASYNCHRONOUS TRANSCEIVER DEVICE FOR POWER LINE COMMUNICATION NETWORKS

REFERENCES TO RELATED APPLICATIONS

This application is a continuation-in-part of International Patent Application No. PCT/IT2006/000166, filed Mar. 17, 2006, now pending, which application is incorporated herein by reference in its entirety.

BACKGROUND

1. Technical Field

The present invention relates to an electronic synchronous/asynchronous transceiver device, for instance for power line communication networks and similar systems. More specifically, the invention relates to a transceiver device for power line communication networks of the type integrated into a single chip and operating from a single supply voltage.

2. Description of the Related Art

In this specific technical field it is known on the market a circuit transceiver named "ST7538" which is a half duplex synchronous/asynchronous FSK modem designed for power line communication network applications.

This known circuit operates from a single supply voltage and integrates a line driver and a 5V linear regulator.

The circuit operation is controlled by means of an internal register, programmable through the synchronous serial interface.

Additional functions such as watchdog, clock output, output voltage and current control, preamble detection, time-out, band in use are included.

This circuit is realized in multipower BCD5 technology that allows to integrate DMOS, bipolar and CMOS structures in a same chip.

This known circuit is a multi-frequency device and eight programmable carrier frequencies are available.

However, only one carrier at a time may be used; even if it's possible to switch the communication channel during the normal working mode. When the desired frequency is selected in a control register the transmission and reception filters are accordingly tuned.

This circuit ST7538 exchanges data with the host processor through a serial interface. The data transfer is managed by a couple of lines, while data are exchanged using separate receiving and transmitting lines.

Four are the ST7538 working modes:
data reception;
data transmission;
control register read;
control register write.

Moreover, two type of communication interfaces are available:
asynchronous;
synchronous.

The selection can be done through an internal control register.

In the asynchronous mode data are exchanged without any auxiliary clock reference and without adding any protocol bits. The host controller has to recover the clock reference in receiving mode and control the bit time in transmission mode. The receiving line is forced to a low logic level when no carrier is detected.

On the contrary, in the synchronous mode, the circuit allows to interface the host controller using a four line synchronous interface. The circuit is always the master of the communication and provides the clock reference on the control and timing line.

When the circuit is in the receiving mode an internal PLL recovers the clock reference. Data on the receiving line are stable on a rising edge of the control and timing line.

When the circuit is in transmitting mode the clock reference is internally generated and data are read on the transmitting line on the rising edge of the control and timing line.

While being advantageous under many points of view and substantially providing a solution for a large spectrum of modem communication this known circuit is very complex and also very expensive to render it unusable for low cost applications.

For instance, the currently high demand of "outdoor" applications, such as small street lighting controllers and cost effective Automatic Meter Reading (AMR) systems may not be satisfied by the use of the above mentioned prior art solution, if not supporting a higher overall cost.

Moreover, the prior art circuit cannot supply different kinds of controllers that may be connected to the transceiver device in specific applications; this compels providing specific circuit portions on board of each single controller.

BRIEF SUMMARY

One embodiment is a new power line transceiver device having structural and functional features that allow a simpler connection with a host controller while improving the device linear power performances and reducing the device overall consumption.

The power line transceiver device has a reduced integrated circuit area and is more cost-effective if compared with the prior art solutions.

One embodiment is a fast transceiver for system controllers mounted on outdoor devices for various outdoor applications.

One embodiment is an electronic synchronous/asynchronous transceiver device for power line communication networks of the type integrated into a single chip and operating from a single supply voltage, comprising:
  at least an internal register that is programmable through a synchronous serial interface;
  at least a line driver for a two-way network communication over power lines implemented by a single ended power amplifier with directly accessible input and output lines that is part of a tunable active filter for the transmission path; and
  at least a couple of linear regulators for powering with different voltage levels different kind of external controllers linked to the transceiver device.

The features and advantages of the transceiver device will appear from the description of a corresponding example given by way of non-limiting embodiment with reference to the enclosed drawings.

BRIEF DESCRIPTION OF THE SEVERAL VIEWS OF DRAWINGS

DETAILED DESCRIPTION

Figure 3:
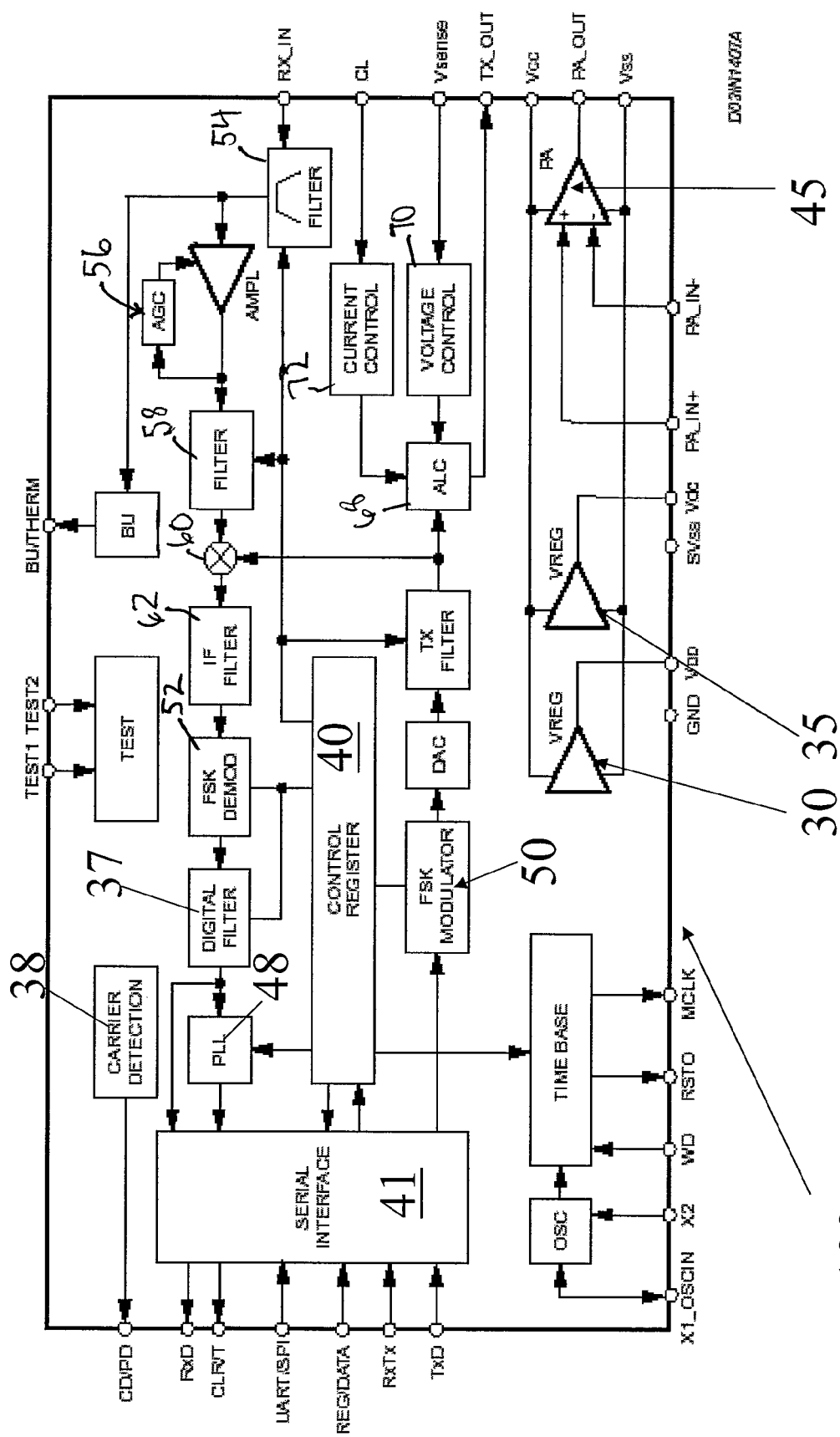
FIG. 3 is a schematic view of a modem device according to one embodiment.

According to one embodiment, for instance the embodiment shown in FIG. 3, a new electronic power line transceiver device 100 is disclosed for applications on power line communication networks.

More specifically, the transceiver device 100 is a half duplex synchronous/asynchronous binary-FSK (frequency shift keying) modem device that may be employed in narrow-band power line communication applications, in particular for compact and cost-sensitive command and control systems.

Such a modem device is realized as a single integrated circuit operating from a single supply voltage. The modem device 100 incorporates at least a line driver 45 and at least two linear regulators 35, 30 for 5V and 3.3V, respectively.

The device operation is controlled by means of an internal register 40 that is programmable through a synchronous serial interface 41.

Additional functions such as: watchdog, clock output, output voltage and current control, preamble detection, time-out and band in use are also included and will be described later.

The integrated transceiver 100 is realized in multipower BCD5 technology that allows to integrate DMOS, bipolar and CMOS structures in the same chip.

The transceiver device 100 of is a half duplex transceiver structured for a two-way network communication over power lines, with eight selectable carrier frequencies, covering CENELEC bands A, B and C, and four programmable baud rates from 600 to 4800 bps.

The transceiver device 100 comprises a single-ended power amplifier 45 with accessible input and output lines that can be used with a few external signal components 46 (See FIG. 13) as part of a tunable active filter for the transmission path, providing superior linear power performances and reducing the application's parts count and cost, the power amplifier 45 thus implementing the line driver.

Moreover, the device 100 is provided with a new on-chip 3.3V 50 mA voltage regulator 35, intended for powering different kinds of external microcontrollers that may be linked to the transceiver, thus providing greater flexibility and further reducing the overall costs.

Other new features of the transceiver device 100 include programmable header recognition and frame length count—to increase efficiency and reduce power consumption by activating the external microcontrollers only when a message with a specific header or frame length is detected. A programmable output level freezing is also included to increase transmission stability in particularly noisy environments.

The on chip available output voltage and current loops always allow the transmission levels to be automatically and safely adapted to the line impedance.

Figure 1:
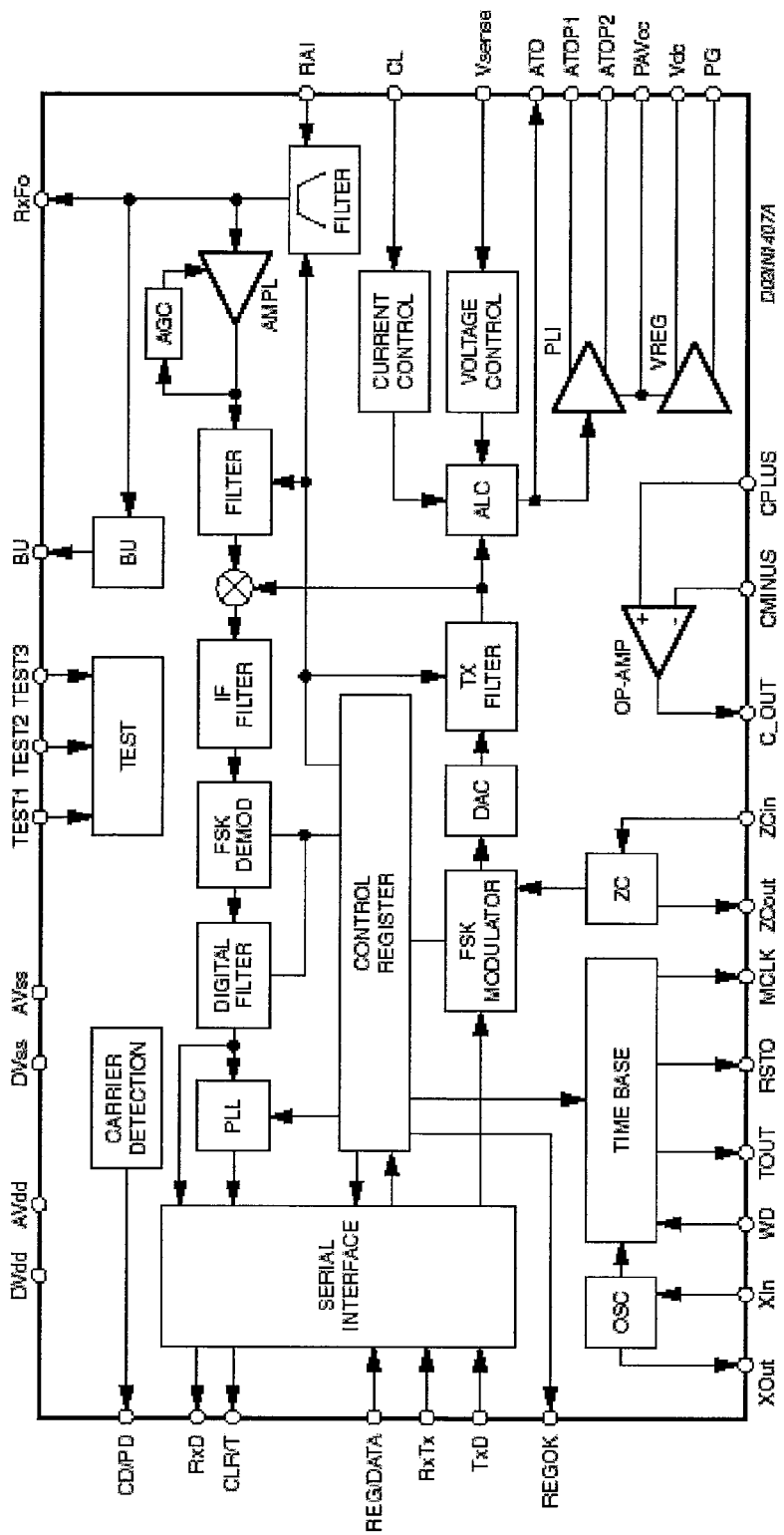
FIG. 1 is a schematic view of a modem device according to the prior art.
Figure 2:
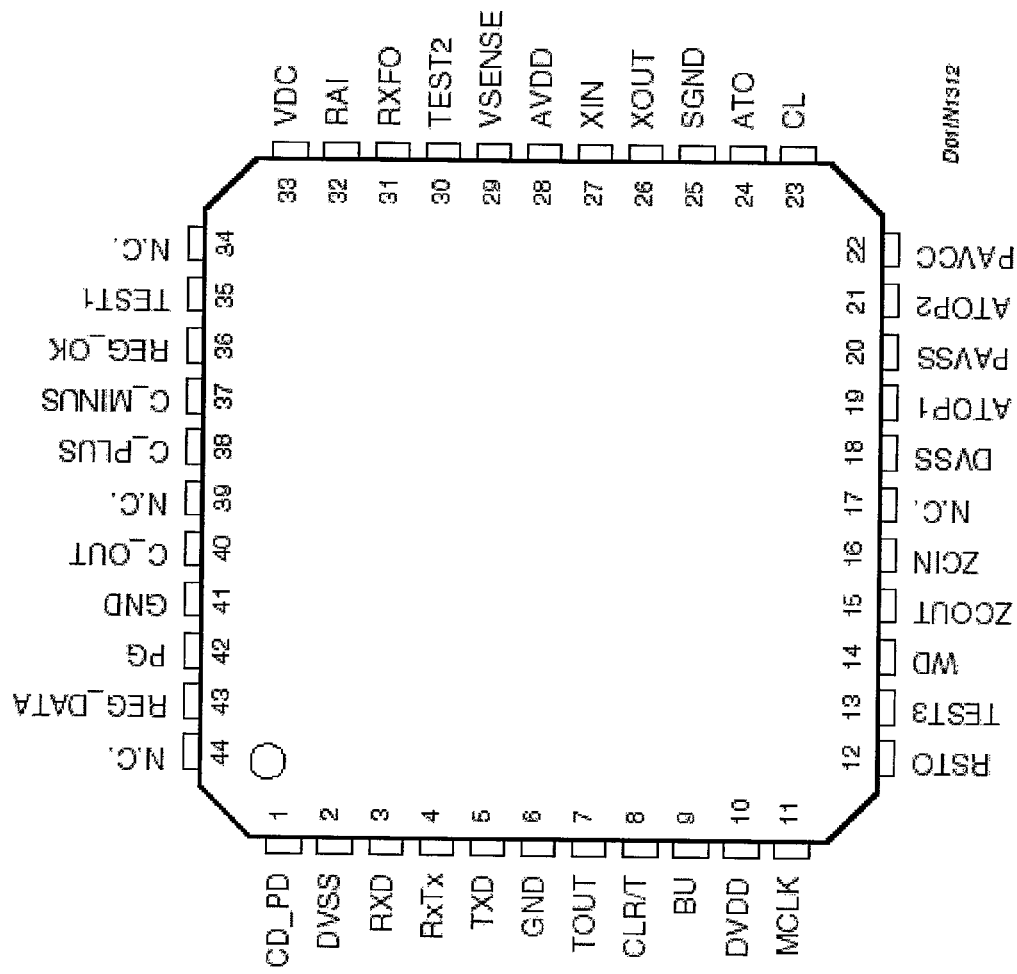
FIG. 2 is a schematic view of the pins of the modem device of FIG. 1.

The transceiver device 100 uses a much smaller and lower pin-count 28-pin package than the state-of the-art circuits (e.g., 44-pin count of prior art transceiver device shown in FIGS. 1-2) and enables the design of very compact home and building automation, such as easily integrating a complete PLC node in a socket or switch. It is also ideal for "outdoor" applications, such as small street lighting controllers and cost effective Automatic Meter Reading (AMR) systems. Its high level of integration, and in particular its new power amplifier topology, significantly reduces the overall BOM (bill of materials) cost of such products.

Figure 4:
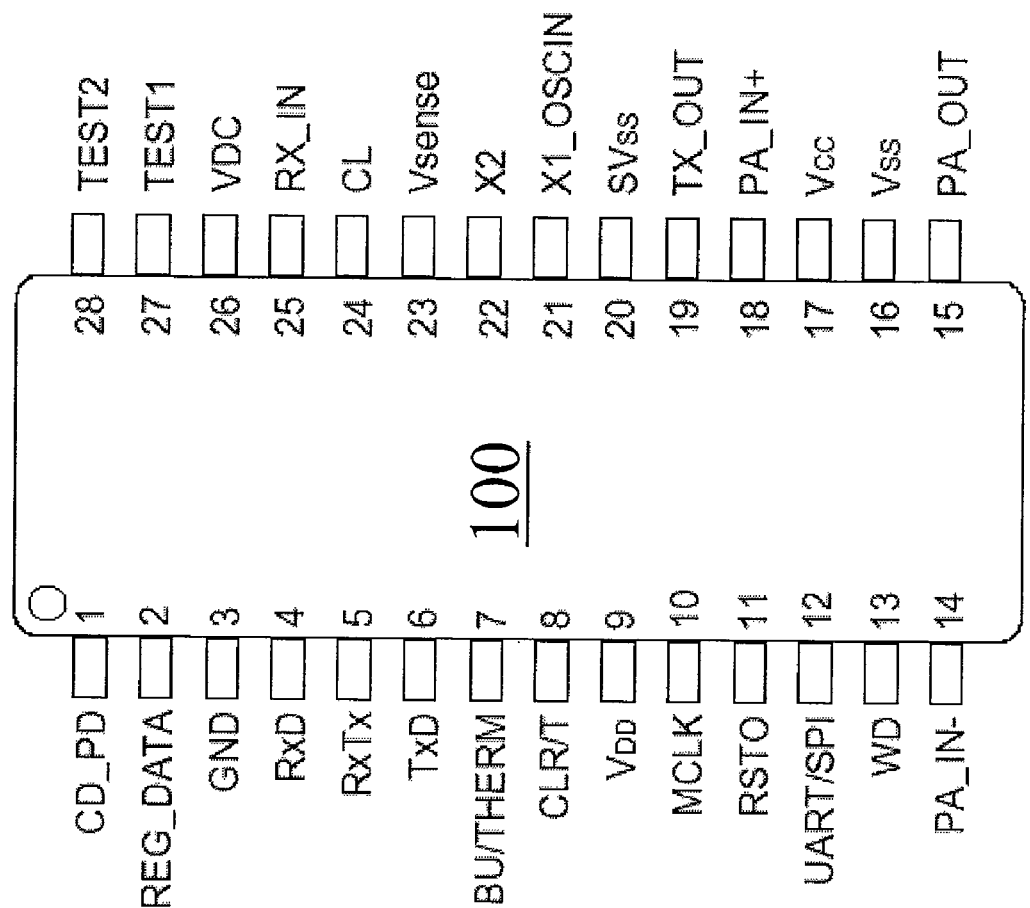
FIG. 4 is a schematic view of the pins of the modem device of FIG. 3.

The device 100 is linked to a host controller as will be clear from the following description. Let's first briefly see the functions of the chip pins shown in FIG. 4:

The pin 1 is a digital output and issues a signal CD_PD from a carrier detector 38, this pin is used as output preamble or frame header detect output. The logic values of this output pin 1 may be:

"1" when there is no carrier, with preamble or frame header detected; or

"0" when there is a carrier, with preamble or frame header detected.

The pin 2 is a digital input receiving a signal REG_DATA for the serial interface 41. This input has internal pull-down, mains or control register access selector. The logic values indicates:

"1"—control register access, or

"0"—mains access.

The pin 3 is connected to a supply digital ground; that is a virtual signal ground GND for the whole device.

The pin 4 is a digital output for a signal RxD representing the received data output RX.

The pin 5 is a digital input for a signal RxTx with internal pull-up and Rx or Tx mode selection input. The logic values of this input indicates:

"1"—RX Session, or

"0"—TX Session.

The pin 6 is a digital input for a signal TxD with internal pull-down and TX data input.

The pin 7 is a digital output for a signal BU/THERM whose logic values indicates:

in Rx mode:

"0"—no signal within the programmed band, and

"1"—signal within the programmed band;

in Tx mode:

"1"—thermal shutdown event occurred, and

"0"—no thermal shutdown event occurred.

The pin 8 is digital output issuing a signal CLR/T indicating the synchronous mains access clock or control register access clock.

The pin 9 is a supply or power terminal receiving a digital supply voltage VDD, which is the voltage regulator output at 3.3V.

The pin 10 is a digital output for a signal MCLK master clock output.

The pin 11 is digital output for a signal RSTO power ON or watchdog reset output.

The pin 12 is a digital input for a signal UART/SPI with internal pull-down interface type indicating:

"0"—serial peripheral interface; and
"1"—UART interface.

The pin 13 is a digital input for a signal WD with internal pull-up watchdog input. The internal watchdog counter is cleared on the falling edges.

The pin 14 is an analog input for the inverting input PA_IN of the power line amplifier 45.

The pin 15 is a power output PA_OUT for the power line amplifier 45.

The pin 16 is supply power analog terminal VSS having ground potential.

The pin 17 is a supply power terminal VCC of the supply voltage.

The pin 18 is an analog input PA_IN+ for the power line amplifier 45, a non-inverting input.

The pin 19 is an analog output TX_OUT for a small signal analog transmit output.

The pin 20 is an analog terminal SVSS for a signal having ground potential.

The pin 21 is an analog output X1 for a crystal oscillator output.

The pin 22 is an analog input X2 for a crystal oscillator input-external clock input.

The pin 23 is an analog input/output voltage VSENSE and a sensing input for the voltage control loop.

The pin 24 is an analog input CL for a current limiting feedback. A resistor between CL and SVSS sets the PLI current limiting value The pin 25 is an analog input for receiving an analog input RX_IN.

The pin 26 is an output for a power 5V voltage regulator output VDC.

The pin 27 is a digital input with internal pull-down for a test input TEST1. Is connected to GND.

The pin 28 is an analog input for receiving a test input TEST2. Is connected to SVSS.

Carrier Frequencies

The transceiver 100 is a multi-frequency device and eight programmable carrier frequencies are available as shown in the following Table 6.

One could use only one carrier at a time. The communication channel could be varied during the normal working mode to obtain a multi-frequency communication.

By selecting the desired frequency in the control register 40 the transmission and reception filters are accordingly tuned.

TABLE 6

Channels List

| FCarrier | F (KHz) |
|---|---|
| F0 | 60 |
| F1 | 66 |
| F2 | 72 |

TABLE 6-continued

Channels List

| FCarrier | F (KHz) |
|---|---|
| F3 | 76 |
| F4 | 82.05 |
| F5 | 86 |
| F6 | 110 |
| F7[1] | 132.5 |

[1]Default value

Baud Rates

The transceiver 100 is also a multi-baud rate device with four available baud rates as reported in the following Table 7.

TABLE 7

ST7540 mark and space tones frequency distance Vs. baud rate and deviation

| Baud Rate [Baud] | ΔF [1] (Hz) | Deviation [2] |
|---|---|---|
| 600 | 600 | 1 [3] |
| 1200 | 600 | 0.5 |
|  | 1200 | 1 |
| 2400 [4] | 1200 [4] | 0.5 |
|  | 2400 | 1 |
| 4800 | 2400 | 0.5 |
|  | 4800 | 1 |

[1] Frequency deviation
[2] Deviation = ΔF/(Baud Rate)
[3] Deviation 0.5 not allowed
[4] Default value Mark and space communication frequencies are defined by the following formula:

F ("0")=FCarrier+[ΔF]/2
F ("1")=FCarrier−[ΔF]/2

ΔF is the frequency deviation.

With deviation="0.5" the difference in terms of frequency between the mark and space tones is half the baud rate value (F=0.5*baud rate). When the deviation="1" the difference is the Baud Rate itself (F=baud rate). The minimal frequency deviation is 600 Hz.

Mains Access

The device 100 can access the mains in two different ways:
synchronous access; and
asynchronous access.

The choice between the two types of access can be performed by means of the control register 40 (the fourteenth bit) and affects the data flow in the transmission mode as well as in the reception mode.

Let's first see the data transmission mode:

Synchronous Mains Access

The on clock signal is provided by the device on the CLR/T line rising edge; the data transmission line (TxD line) value is read and sent to the FSK modulator 50.

The transmission timing is managed according to the selected baud rate.

Asynchronous Mains Access

The data transmission line (TxD line) value is entered directly to the FSK modulator 50. The host controller manages the transmission timing (CLR/T line should be neglected).

Data Reception Mode

During the synchronous mains access: the on clock signal is recovered by a PLL 48 from the CLR/T line rising edge, the value on a FSK demodulator 52 is read and put to the data reception line (RxD line). The device manages the transmission timing according to the baud rate selected.

During the asynchronous mains access: the value on FSK demodulator 52 is sent directly to the data reception line (RxD line). The host controller recovers the transmission timing (CLR/T line should be neglected).

The device 100 exchanges data with the host controller through a serial interface. The data transfer is managed by the lines REG_DATA and RxTx, while data are exchanged using the lines RxD, TxD and CLR/T.

There are four working modes allowed by the device as reported in the following Table 9:

data reception;

data transmission;

control register read; and control register write.

REG_DATA and RxTx lines are level sensitive inputs.

TABLE 9

Data and Control register access bits configuration

|  | REG_DATA | RxTx |
|---|---|---|
| Data Transmission | 0 | 0 |
| Data Reception | 0 | 1 |
| Control Register Read | 1 | 1 |
| Control Register Write | 1 | 0 |

The device features two types of host communication interfaces:

SPI; and

UART.

The selection can be done through the UART/SPI pin 12. If the UART/SPI pin 12 is forced to "0" the SPI interface is selected while if the UART/SPI pin 12 is forced to "1" the UART interface is selected.

The type of interface affects the data reception by setting the idle state of RxD line. When the device 100 is in receiving mode (REG_DATA="0" and RxTx="1") and no data are available on the mains (or RxD is forced to an idle state, i.e., with a conditioned detection method), the RxD line is forced to "0" when UART/SPI pin 12 is forced to "0" or to "1" when UART/SPI pin 12 is forced to "1".

The UART interface allows to connect a UART compatible device and the SPI interface allows to connect an SPI compatible device. The allowed combinations of host interface/mains access are reported in this following Table 10:

TABLE 10

Host interface/ST7540 mains access combinations

| Host device interface type | UART/ SPI pin | Communication mode | Mains access | |
|---|---|---|---|---|
| | | | Asynchronous | Synchronous |
| UART | "1" | Transmission | X | |
| UART | "1" | Reception | X | X |
| SPI | "0" | Transmission | | X |
| SPI | "0" | Reception | | X |

The device 100 allows to interface the host controller using a five line interface (RxD, TxD, RxTx, CLR/T, & REG_DATA) in case of synchronous mains access or using a three line interface (RxD, TxD & RxTx) in asynchronous mains access. Since the control register 40 is not accessible in asynchronous mode, in this case REG_DATA pin is tied to GND.

Figure 5:
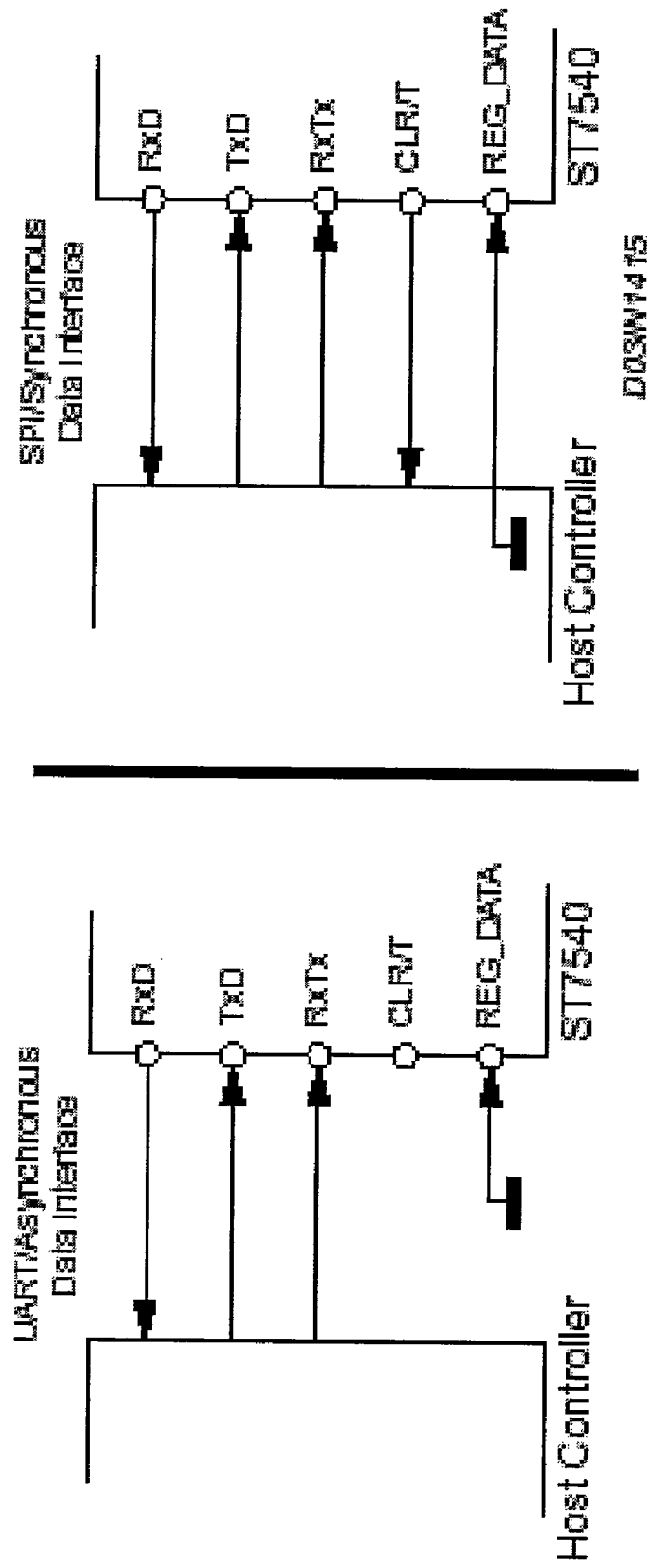
FIG. 5 is a schematic view of the synchronous and asynchronous host controller interfaces.
Figure 6:
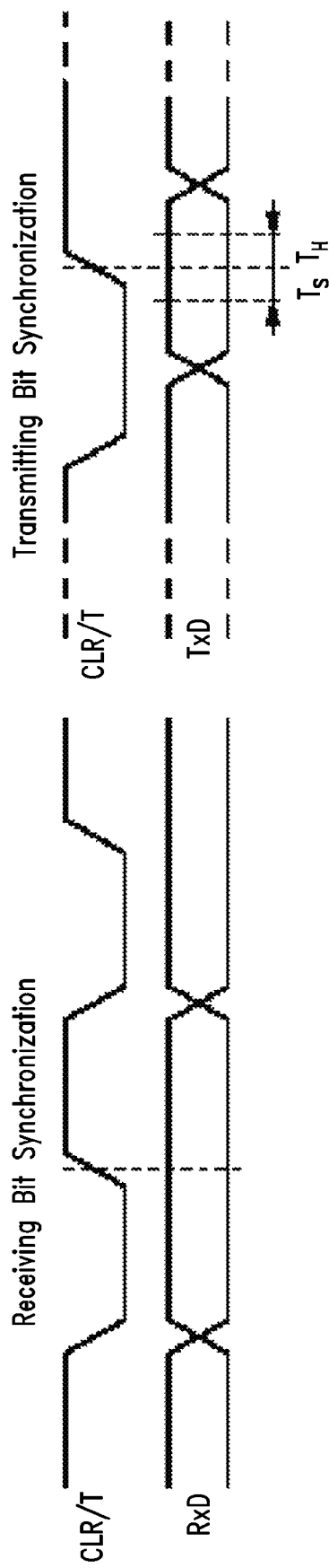
FIG. 6 shows the recovered clock timing of the receiving and transmitting data.

This is shown in FIG. 5.

The communication between the host controller and the device 100 is achieved by the mains access and by selecting REG_DATA="0" so that the choice between data transmission and data reception is performed by selecting RxTx line (if RxTx="1" the device receives data from mains, if RxTx="0" the device transmits data over the mains).

The communication between the host controller and the transceiver device is different in asynchronous and synchronous mode:

Asynchronous Mode

In the asynchronous mode, data are exchanged without any data clock reference. The host controller recovers the clock reference in receiving mode and controls the bit time in transmission mode.

If the RxTx line is set to "1" & REG_DATA="0" (data reception), the device enters in an idle state. After a Tcc time the modem starts providing received data on the RxD line.

If the RxTx line is set to "0" & REG_DATA="0" (data transmission), the device enters in an idle state and the transmission circuitry is switched on. After a Tcc time the modem starts transmitting data present on the TxD line.

Synchronous Mode

Figure 7:
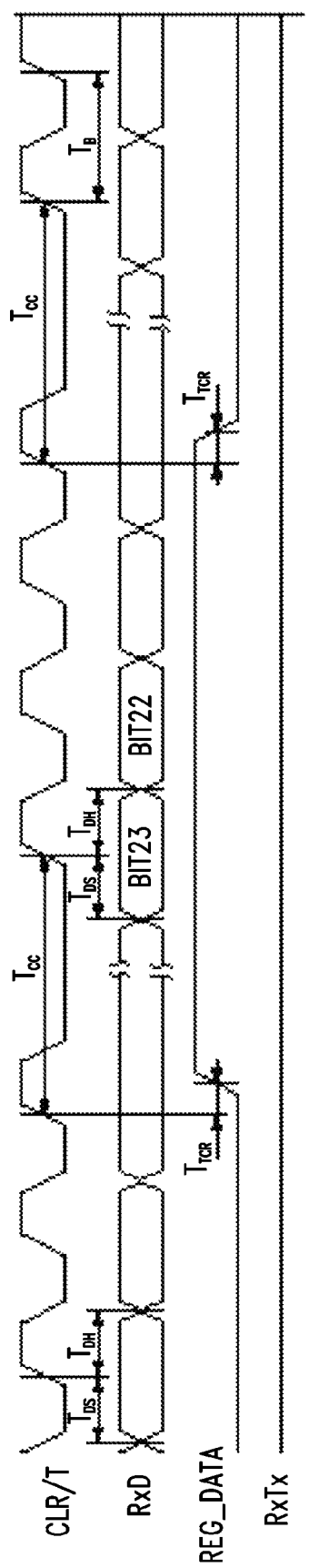
FIG. 7 is timing diagram of the data reception and control register reading phase.

As shown in FIG. 7, in the synchronous mode the device 100 is the master of the communication and provides the clock reference on CLR/T line. When the device is in receiving mode the internal PLL 48 recovers the clock reference. Data on the RxD line are stable on CLR/T rising edge.

When the device is in transmitting mode the clock reference is internally generated and the TxD line is sampled on CLR/T rising edge.

If the RxTx line is set to "1" & REG_DATA="0" (data reception), the device enters in an idle state and the CLR/T line is forced Low. After a Tcc time the modem starts providing received data on the RxD line.

If the RxTx line is set to "0" & REG_DATA="0" (Data Transmission), the device enters in an Idle state and transmission circuitry is switched on. After a Tcc time the modem starts transmitting data present on TxD line.

Control Register Access

The communication with the device control register 40 is synchronous. The access is achieved using the same lines of the mains interface (RxD, TxD, RxTx and CLR/T) plus REG_DATA Line.

With REG_DATA=1 and RxTx=0, the data present on TxD are loaded MSB first into the control register 40. The device 100 samples the TxD line on CLR/T rising edges. The control register content is updated at the end of the register access section (REG_DATA falling edge).

In normal control register mode (control register bit twenty-one="0") if more than twenty-four bits are transferred to the device only the latest twenty-four bits are stored inside the control register. If less than twenty-four bits are transferred to the device the control register writing is aborted.

In order to avoid undesired control register writings caused by REG_DATA line fluctuations, for example due to surge or burst on the mains), in an extended control register mode (with control register bit twenty-one="1") exactly twenty-four or forty-eight bits must be transferred to the device in order to properly write the control register, otherwise writing is aborted. With REG_DATA=1 and RxTx=1, the content of the control register is sent on the RxD port.

The data on RxD are stable on CLR/T rising edges MSB first. In normal control register mode twenty-four bits are transferred from the device to the host. In extended control register mode twenty-four or forty-eight bits are transferred from the device to the host depending on the content of control register bit eighteen (with bit eighteen="0" the first twenty-four bits are transferred, otherwise all forty-eight bits are transferred).

Figure 8:
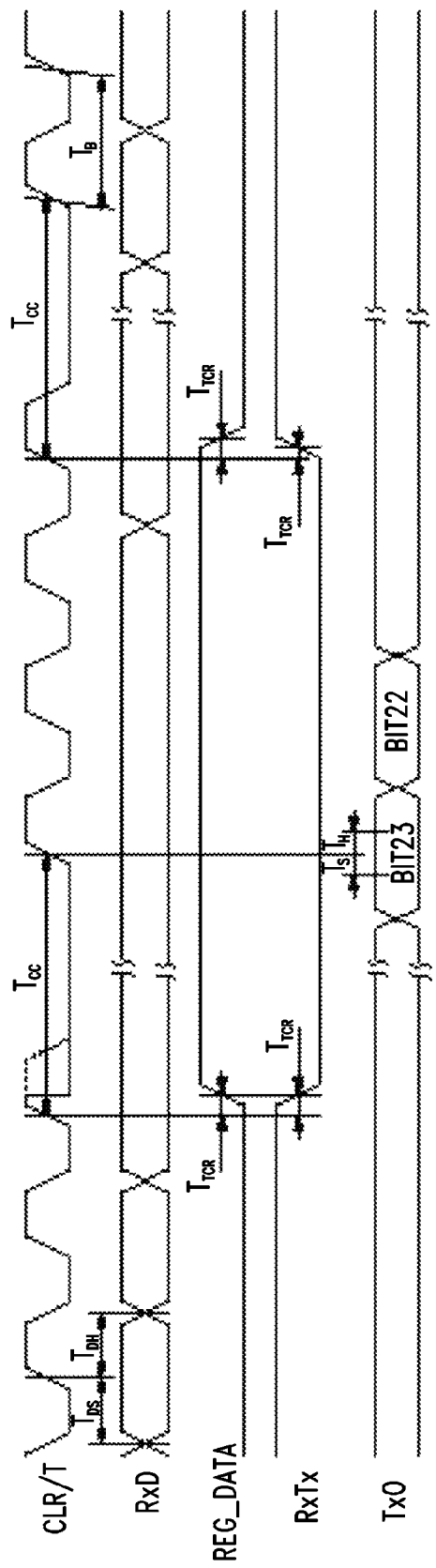
FIG. 8 is timing diagram of the data reception and control register writing phase.
Figure 9:
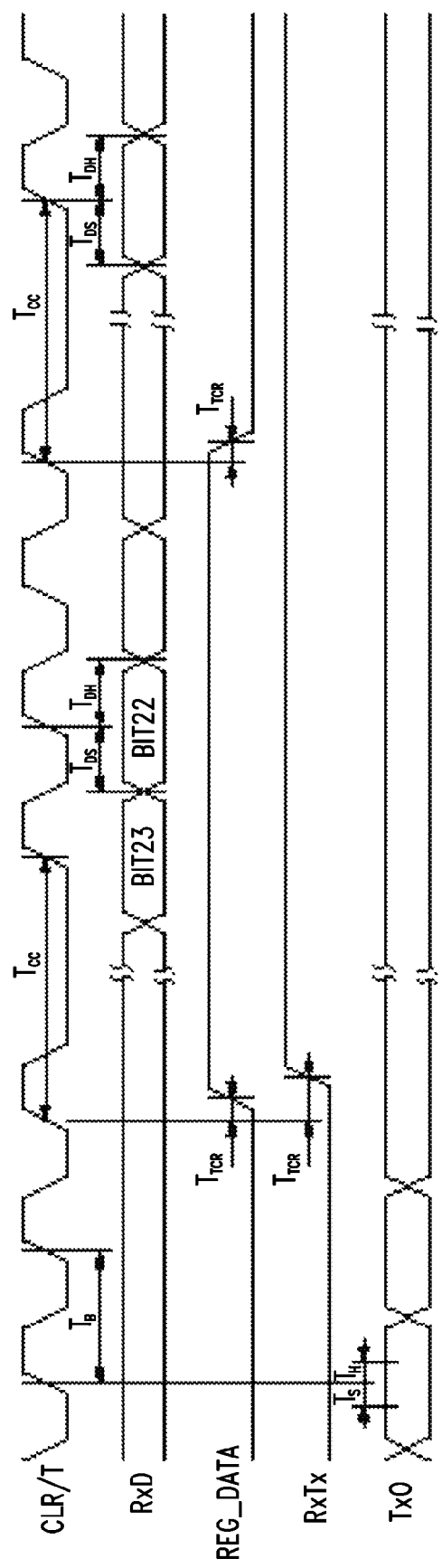
FIG. 9 is timing diagram of the data transmission and control register reading phase.
Figure 10:
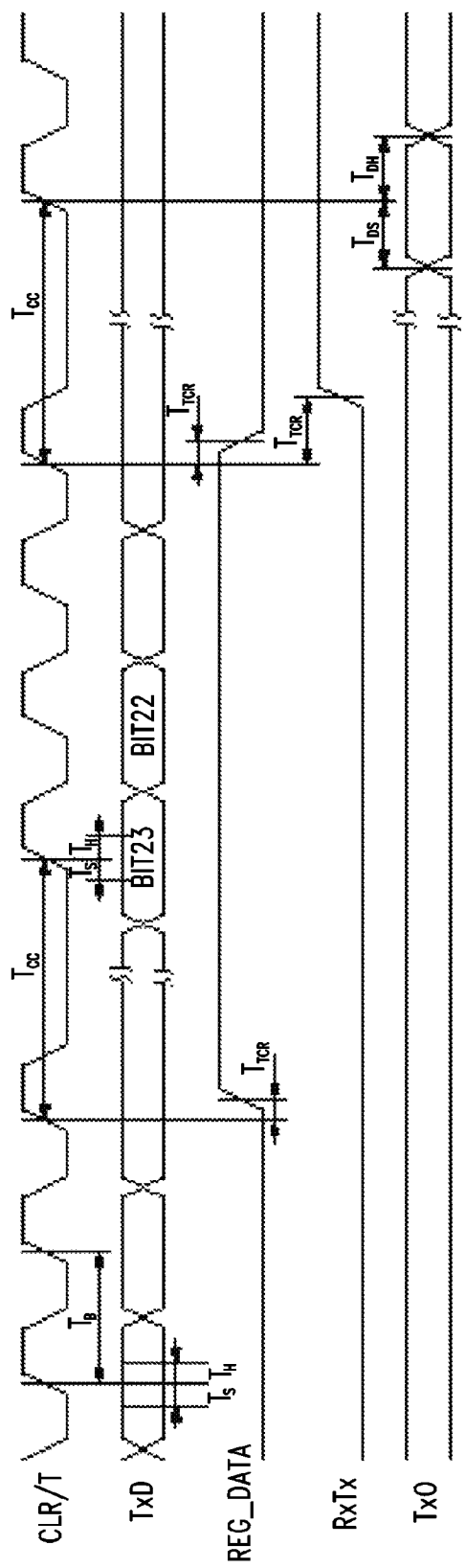
FIG. 10 is timing diagram of the data transmission and control register writing phase.

This is clearly shown by the diagrams of FIGS. 7 and 8 for the receiving mode and in FIGS. 9 and 10 for the transmitting mode.

Figure 12:
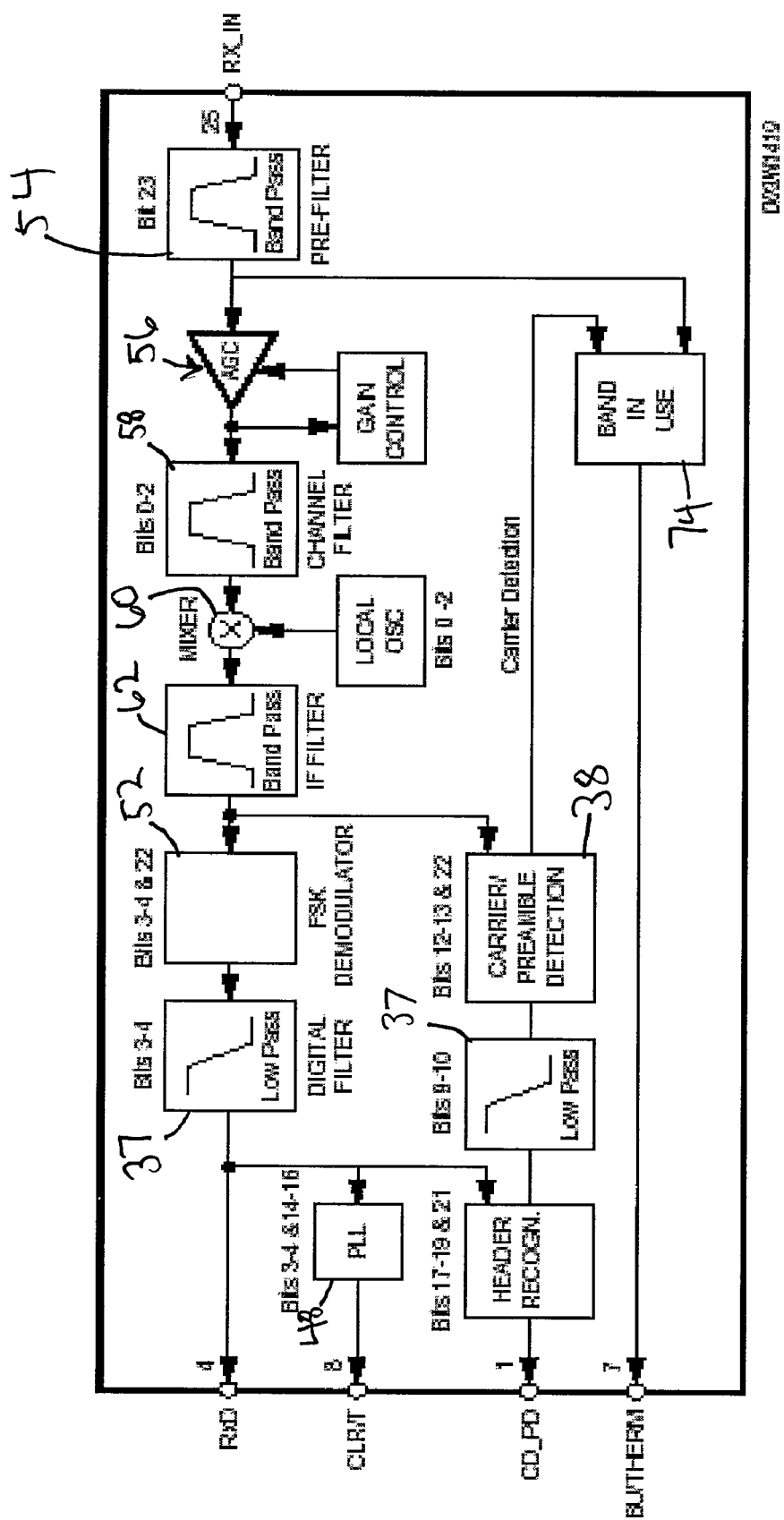
FIG. 12 is a schematic and more detailed view of a portion of the transceiver device of FIG. 3 and, more specifically, a receiving path block diagram of this device.

Receiving Mode (FIG. 12)

The receive section is active when RxTx Pin="1" and REG_DATA=0.

The input signal is read on the RX_IN pin using SVSS as ground reference and then pre-filtered by a band pass filter (+−10 KHZ) 54. The pre-filter 54 can be inserted by setting one bit in the control register 40. The input stage features a wide dynamic range to receive the signal with a very low signal to noise ratio. The amplitude of the applied waveform is automatically adapted by an automatic gain control block (AGC) 56 and then filtered by a narrow band band-pass filter 58 centered around the selected channel frequency (+−6K). The resulting signal is down-converted by a mixer 60 using a sine wave generated by the FSK modulator 50.

Finally an intermediate frequency band pass-filter (IF filter) 62 improves the signal to noise ratio before sending the signal to the FSK demodulator 52.

The FSK demodulator then sends the signal to the RX logic for final digital filtering. Digital filtering in the digital filter 37 removes noise spikes far from the baud rate frequency and reduces the signal jitter.

The RxD Line is forced to "0" or "1" (according the UART/SPI pin level) when neither mark or space frequencies are detected on the RX_IN pin.

Mark and space frequencies in the receiving mode should be distant at least (baud rate)/2 to have a correct demodulation.

While the device is in the receiving mode (RxTx pin="1"), the transmit circuitry, including the power line interface, is turned off.

This allows the device to achieve a very low current consumption (about 5 mA typ).

It worthwhile to note that it is possible to select the device receiving sensitivity level using the control register 40 or setting to '1' the TxD pin during reception phase (this condition supervises the control register setting the sensitivity equal to BU threshold).

Increasing the device sensitivity allows to improve the communication reliability when the device sensitivity is the limiting factor.

The transceiver device 100 embeds a clock recovery system to feature a synchronous data exchange with the host controller.

The clock recovery system is realized by means of the PLL 48, which is a second order PLL.

In synchronous mode, data on the data line (R×D) are stable on CLR/T line rising edge (CLR/T falling edge synchronized to R×D line transitions±lock-in range).

Figure 11:
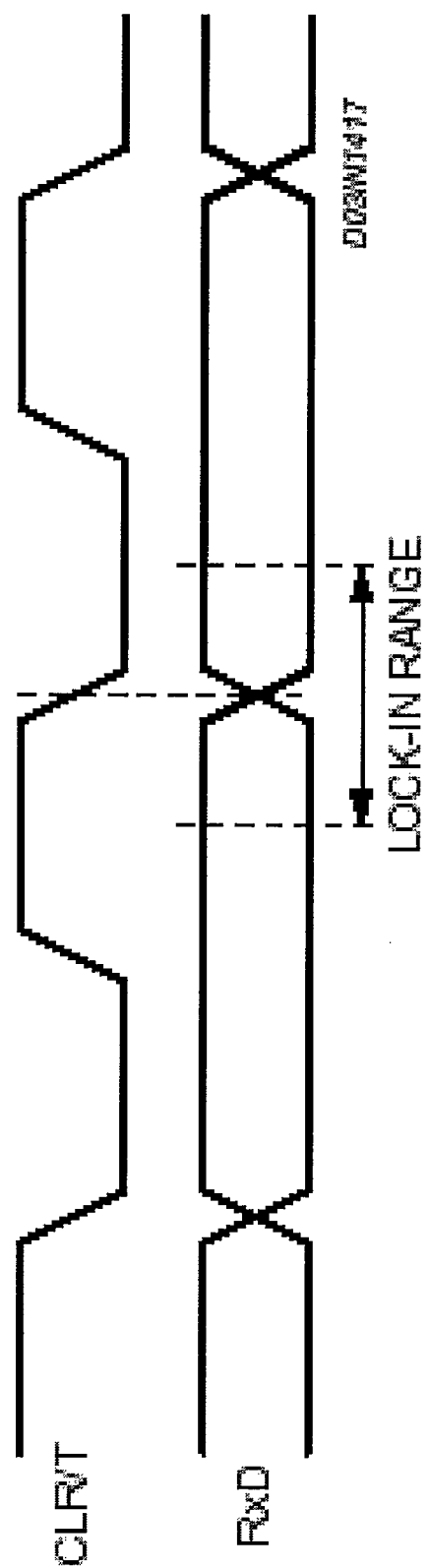
FIG. 11 is a diagram showing the PLL lock-in range.

The PLL lock-in and lock-out range is ±δ/2. When the PLL is in the unlock condition RxD line is forced to "0" or "1" according to the UART/SPI pin 12 level and CLR/T is forced to "0" only if the detection method "Preamble Detection With Conditioning" is selected. See also the diagram in FIG. 11.

When the PLL 48 is in unlock condition it is sensitive to RxD rising and falling edges.

The maximum number of transitions to reach the lock-in condition is five in one embodiment.

When in lock-in condition the PLL is sensitive only to RxD rising edges to reduce the CLR/T jitter.

The device PLL 48 is forced in the un-lock condition, when more than thirty-two equal symbols are received.

This is due to the fact that the PLL, in lock-in condition, is sensitive only to the RxD rising edge, sequences equal or longer than fifteen equal symbols can put the PLL into the un-lock condition.

Carrier/Preamble Detection

The carrier/preamble block 38 is a digital frequency detector circuit.

It can be used to manage the mains access and to detect an incoming signal.

Two are the possible settings:

carrier detection; and preamble detection.

Carrier Detection:

The carrier/preamble detection block 38 notifies the host controller (CP_PD signal) of the presence of a carrier when it detects on the RX_IN input a signal with a harmonic component close to the programmed carrier frequency.

The CD_PD signal sensitivity is identical to the data reception sensitivity (1 mVrms typ. in normal sensitivity mode).

When the device sensitivity is set by the TxD line (sensitivity level equal to BU threshold) the CD_PD signal is conditioned to the BU signal.

The CD_PD line is forced to a logic level low when a carrier is detected.

Preamble Detection:

The carrier/preamble detection block 38 notifies the host controller of the presence of a carrier modulated at the programmed baud rate for at least four consecutive symbols ("1010" or "0101" are the symbol sequences detected).

The CD_PD line is forced low till a carrier signal is detected and the PLL 48 is in the lock-in range.

To reinforce the effectiveness of the information given by the carrier/preamble detection block 38, a digital filtering is applied by the filter 37 on the carrier or preamble notification signal.

The detection time bits in the control register 40 define the filter performance.

Increasing the detection time reduced the false notifications caused by noise on main line.

The digital filter 37 adds a delay to the CD_PD notification equal to the programmed detection time.

When the carrier frequency disappears, the CD_PD line is held low for a period equal to the detection time and then forced high.

During this time, some spurious data caused by noise can be demodulated and sent over RxD line.

Header Recognition

When the control register bit twenty-one="1", the CD_PD line can be used to recognize if a header has been sent during the transmission.

With header recognition function enabled (control register bit eighteen="1"), the CD_PD line is forced low when a frame header is detected.

If the frame length count function is enabled, the CD_PD is held low and a number of sixteen bit words equal to the frame length selected are sent to the host controller.

In this case, the CLR/T is forced to "0" and the RxD is forced to "0" or "1" (according the UART/SPI pin 12 level) when the header has not been detected or after the frame length has been reached.

If the frame length count function is disabled, a header recognition is signaled by forcing the CD_PD low for one period of the CLR/T line.

In this case, the CLR/T and RxD signals are always present, even if no header has been recognized.

The block diagram of FIG. 12 shows the circuit portions that are active during the receiving path.

Figure 13:
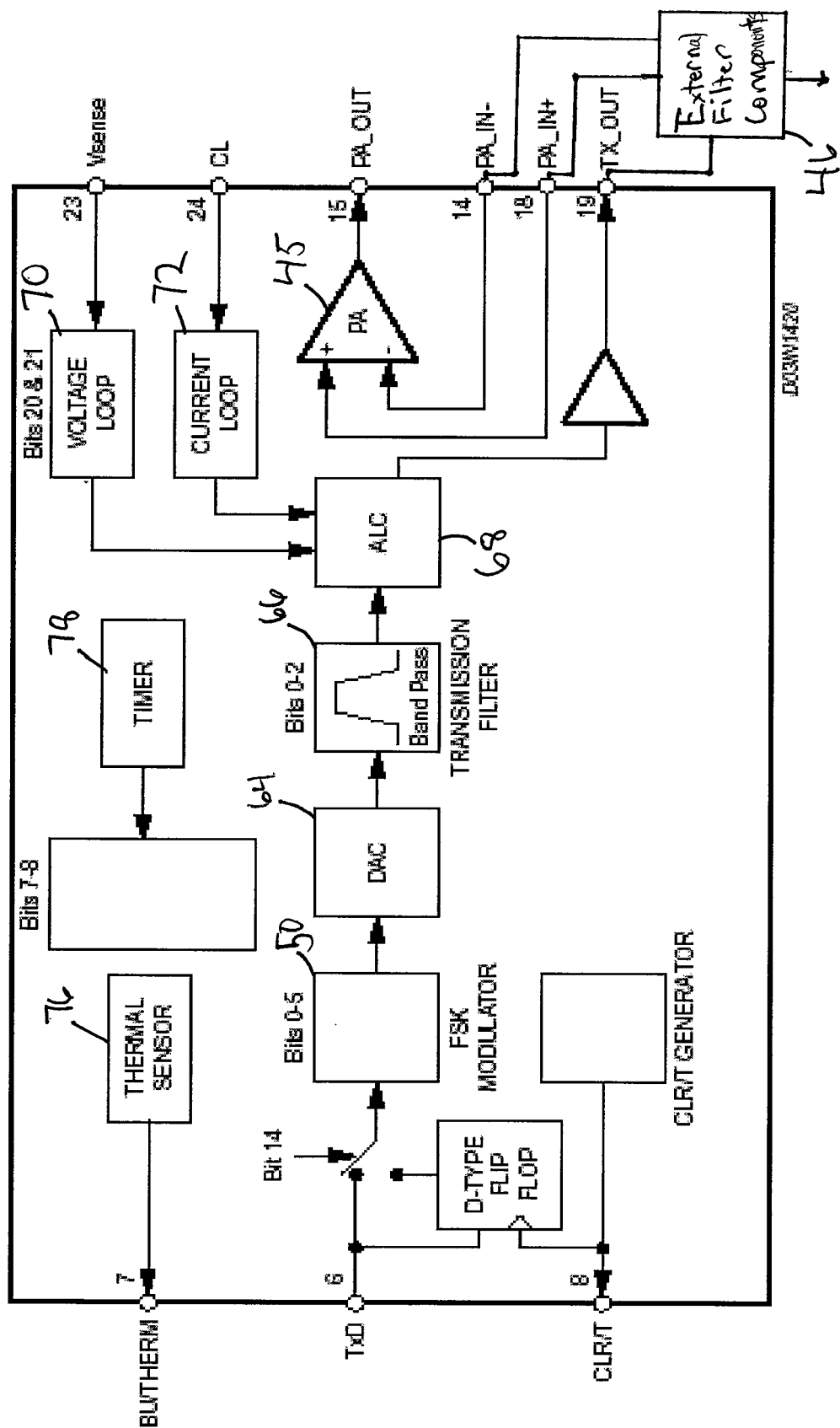
FIG. 13 is a schematic and more detailed view of a portion of the transceiver device of FIG. 3 and, more specifically, a transmitting path block diagram of this device.

Transmission Mode (FIG. 13)

With specific reference to the example of FIG. 13, the transmission mode is set when the RxTx pin is="0" and the REG_DATA pin="0".

In transmitting mode the FSK modulator 50 and the power line interface are turned ON.

The transmit data (TxD) enter synchronously or asynchronously to the FSK modulator.

Synchronous Mains Access:

It happens on the CLR/T rising edge, TxD line value is read and sent to the FSK modulator. The device 100 manages the transmission timing according to the selected baud rate.

Asynchronous Mains Access:

The TxD data enter directly to the FSK modulator 50.

The host controller manages the transmission timing.

In both conditions no protocol bits are added by the device.

The FSK frequencies are synthesized in the FSK modulator from a 16 MHz crystal oscillator by a direct digital synthesis technique. The precision of the frequencies is the same as the external crystal's precision. The output of the FSK modulator is passed to a digital-analog converter (DAC) 64 which converts the TxD data into an analog signal.

In the analog domain, the signal is filtered by a transmission filter 66 in order to reduce the output signal spectrum and to reduce the harmonic distortion. The transition between a symbol and the following is done at the end of the on-going half FSK sine wave cycle.

Automatic Level Control (ALC)

The automatic level control block (ALC) 68 is a variable gain amplifier (with thirty-two non-linear discrete steps) controlled by two analog feed backs acting at the same time. The ALC gain range is 0 dB to 30 dB and the gain change is clocked at 5 KHz. Each step increases or reduces the voltage of 1 dB (Typ). Two are the control loops acting to define the ALC gain:

a voltage control loop 70; and a current control loop 72.

The voltage control loop acts to keep the peak-to-peak voltage constant on Vsense.

The gain adjustment is related to the result of a peak detection between the voltage waveform on Vsense and two internal voltage references. It is possible to protect the voltage control loop 70 against noise by freezing the output level.

If $Vsense<Vsense_{TH}-Vsense_{HYST}$, the next gain level is increased by 1 step;

if $Vsense_{TH}-Vsense_{HYST}<Vsense<Vsense_{TH}+Vsense_{HYST}$, no gain change;

if $Vsense>Vsense_{TH}+Vsense_{HYST}$, the next gain level is decreased by 1 step.

The current control loop 72 acts to limit the maximum peak output current inside PA_OUT.

The current control loop 72 acts through the voltage control loop 70 decreasing the output peak-to-peak amplitude to reduce the current inside the power line interface.

The current sensing is done by mirroring the current in the high side MOS of the power amplifier (not dissipating current sensing).

Figure 14:
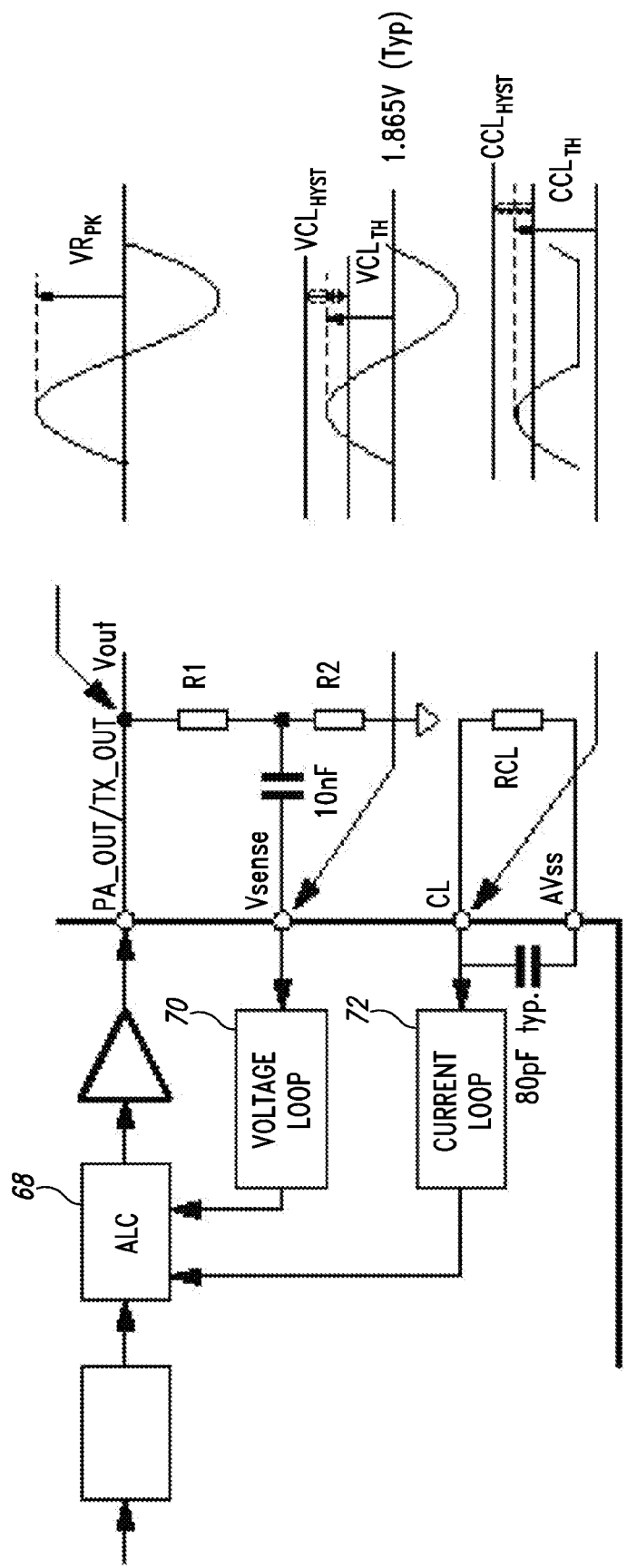
FIG. 14 is another schematic of an example concerning possible voltage and current feedback external interconnections.
Figure 15:
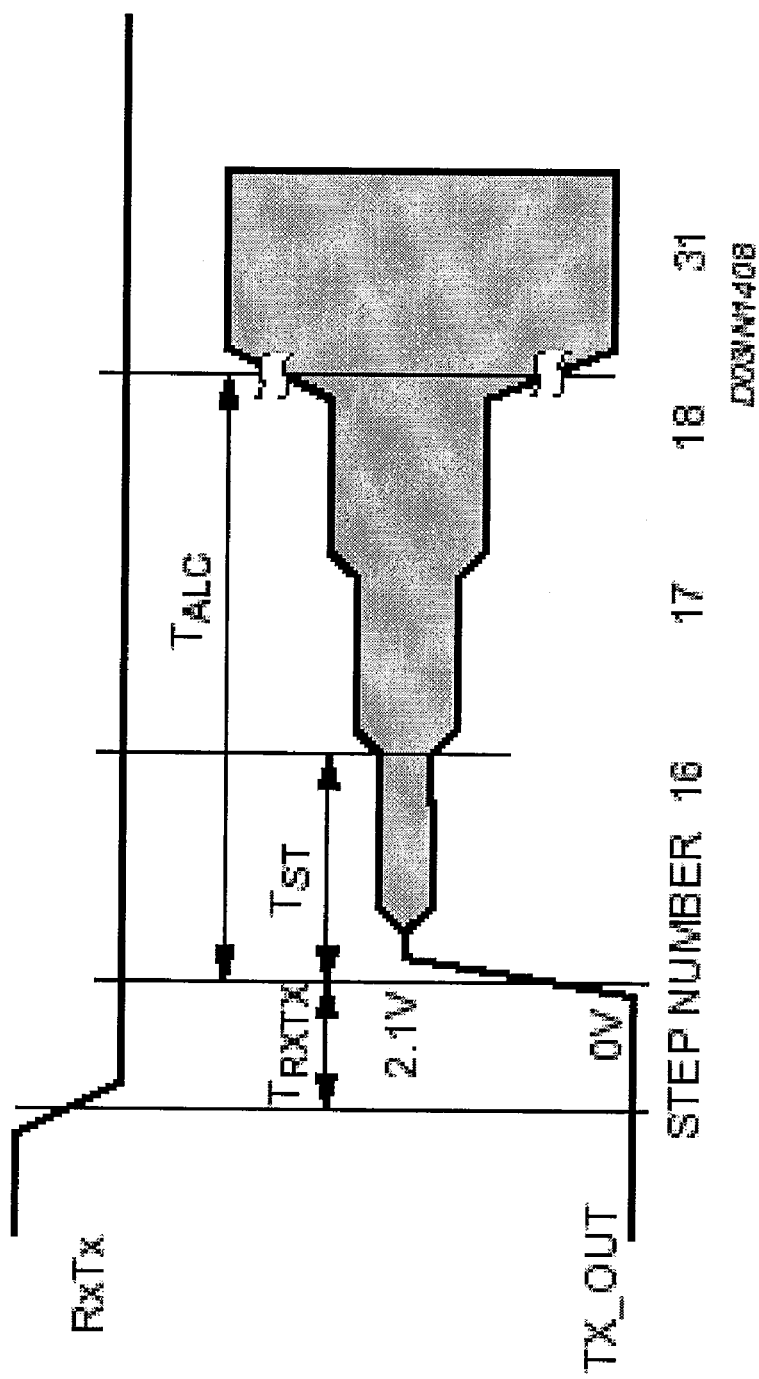
FIG. 15 is a start-up timing diagram of the power line interface incorporated into the transceiver device of FIG. 3.
Figure 16:
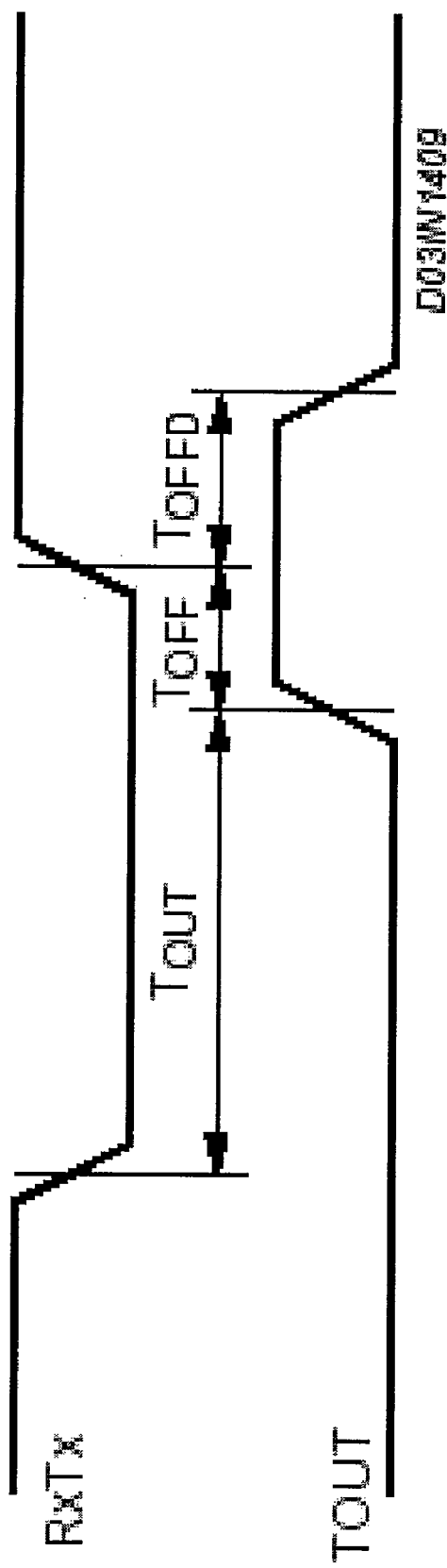
FIG. 16 shows a diagram of a time-out timing and unlock sequence.
Figure 17:
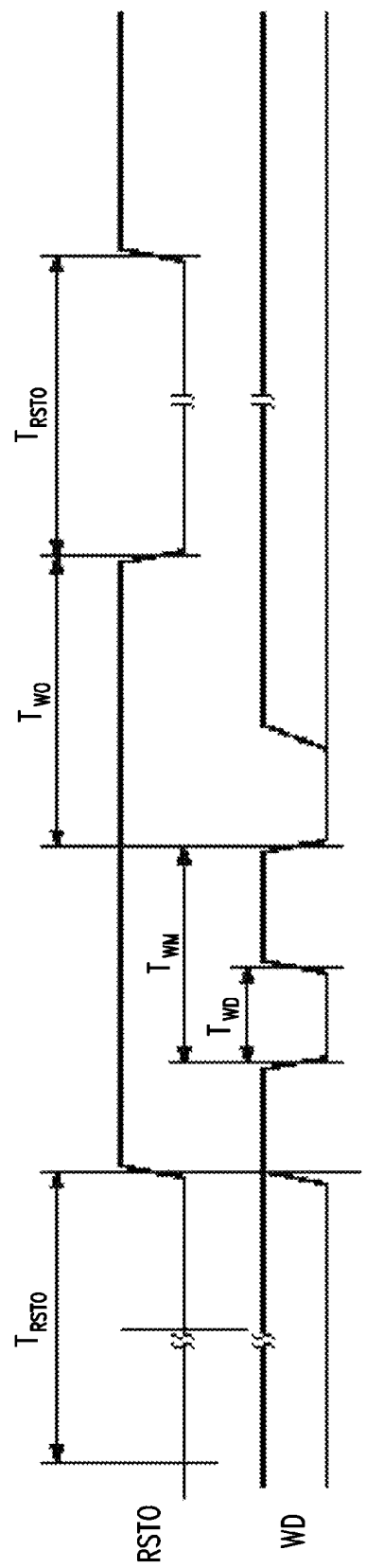
FIG. 17 shows a diagram of a reset and watchdog timing procedure.
Figure 18:
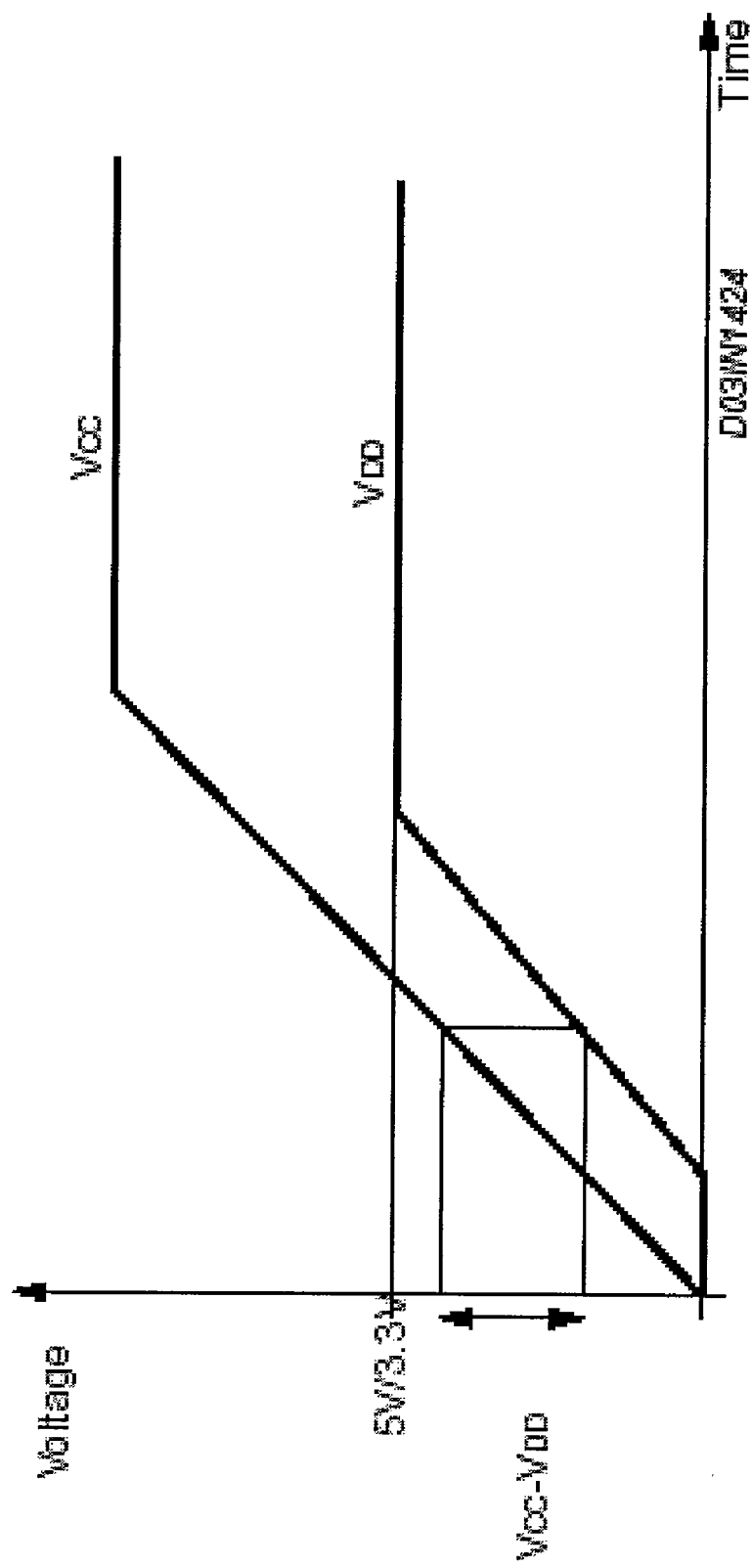
FIG. 18 is a diagram showing the voltage signal involved in the power-up phase.
Figure 19:
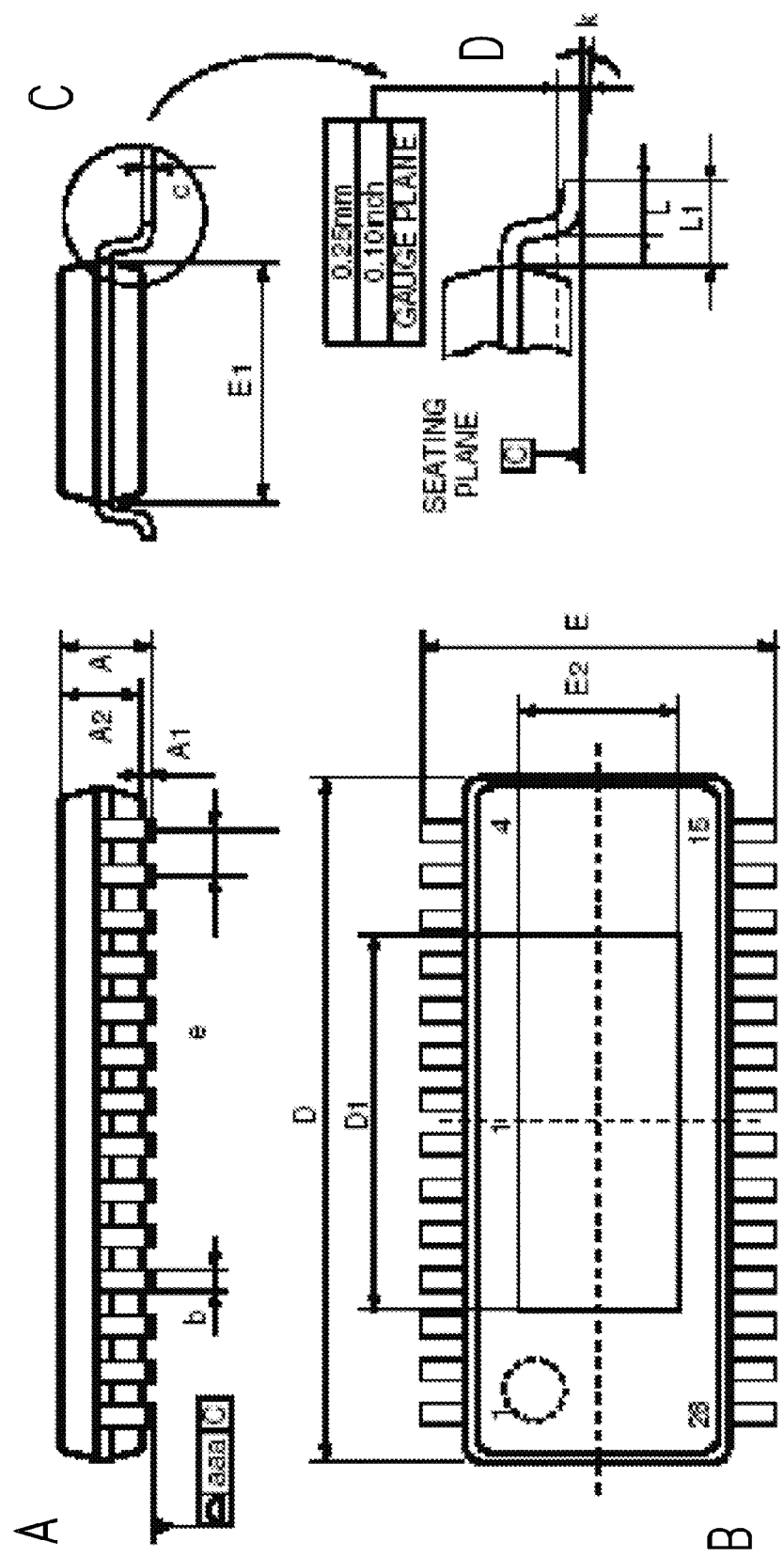
FIGS. 19A, 19B, 19C and 19D are schematic view of the external shape of the integrated transceiver of FIG. 3 in a side view, top view, side view and in an enlarged particular view, respectively.

The output current limit (up to 500 mApeak), can be set by means of an external resistor (RCL) connected between CL and VSS (FIG. 14). The resistor converts the current sensed into a voltage signal.

The peak current sensing block 72 works as the output voltage sensing block:

If $V(CL)<CL_{TH}-CL_{HYST}$, the voltage control loop is acting;

If $CL_{TH}-CL_{HYST}<V(CL)<CL_{TH}+CL_{HYST}$, no gain change;

If $V(CL)>CL_{TH}+CL_{HYST}$, the next gain level is decreased by 1 step.

The voltage control loop formula is:

$$VR_{PK} \cong [(R1+R2)/R2 * (VCL_{TH} \pm VCL_{HYST}].$$

Integrated Power Amplifier (PA)

The power amplifier 45 (PA) is a CMOS AB class power amplifier.

The amplifier 45, to ensure a proper operation, receives a regulated and well filtered supply voltage Vcc.

The VCC voltage fulfills the following formula to enable the amplifier 45 to work without clipping phenomena:

$$Vcc \geq \lfloor V_{PAOUT(AC)}/2 \rfloor + 7.5\ V.$$

The inputs and output of PA are available on pins PA_IN−, PA_IN+ and PA_OUT.

A user can easily select an appropriate active filtering topology to filter the signal present on TX_OUT pin. TX_OUT output has a current capability much lower than PA_OUT.

Control Register

As already remarked the device 100 is a multi-channel and multifunction transceiver.

The internal twenty-four or forty-eight bit control register 40 (in extended mode) allows to manage all the programmable parameters.

The programmable functions are:

channel frequency
baud rate
deviation
watchdog
transmission timeout
frequency detection time
detection method
mains interfacing mode
output clock
sensitivity mode
input pre-filter.

In addition to these functions, the extended mode provides twenty-four additional bits and other functions:

output level freeze
frame header recognizes (one sixteen bits header of or two eight bits headers) with support to frame length bit count.

The device 100 includes also auxiliary functions.

One of those functions is the band in use block 74 (FIG. 12) that has a carrier detection-like function but with a different input sensibility (83.5 dBµV typ.) and with a different band pass filter selectivity (40 dB/dec).

The pin BU/THERM line is forced high when a signal in band is detected.

To prevent BU/THERM line false transition, a band in use flag signal is conditioned to a carrier detection internal signal from the carrier/preamble detector 38.

This function is enabled only in the receiving mode while in the transmission mode the BU/THERM pin is used for thermal shutdown signaling by a thermal sensor 76 (FIG. 13).

A time out function is also provided as a protection against a too long data transmission and employs a timer 78.

When the time out function is enabled, after one or three seconds of continuous transmission, the transceiver is forced in receiving mode.

This function allows the device to automatically manage the CENELEC medium access specification.

When a time-out event occurs, the transmission section is disabled for at least 125 ms.

To unlock the time out condition, the RxTx pin should be forced high.

During the time out period only register access or reception mode are enabled.

During the reset sequence, if the RxTx line="0" and the REG_DATA line="0", the time out protection is suddenly enabled and the device is configured in data reception after the reset event before starting a new data transmission.

The time out time is programmable using control register bits seven and eight.

The RSTO output is a reset generator for the application circuitry.

During the device startup sequence it is forced low. The RSTO becomes high after a TRSTO delay from the end of oscillator startup sequence.

Inside the device is also embedded a watchdog function. The watchdog function is used to detect the occurrence of a software fault of the host controller.

The watchdog circuitry generates an internal and external reset (RSTO low for TRSTO time) on expiry of the internal watchdog timer.

The watchdog timer reset can be achieved applying a negative pulse on WD pin.

The MCLK is the master clock output. The clock frequency sourced can be programmed through the control register to be a ratio of the crystal oscillator frequency (Fosc, Fosc/2 Fosc/4).

The transition between one frequency and another is done only at the end of the ongoing cycle.

The oscillator can be disabled using control register bits fifteen and sixteen.

Output Voltage Level Freeze

The output level freeze function, when enabled, turns off the voltage control loop once the ALC 68 stays in a stable condition for about three periods of the control loop, and maintains a constant gain until the end of transmission. The output level freeze can be enabled using control register bit seventeen. This function is available only using the extended control register mode (that is when the control register bit twenty-one is set="1").

Extended Control Register Function

When the extended control register function is enabled, all the forty-eight bits of the control register 40 are programmable.

Otherwise, only the first twenty-four bits of the control register 40 are programmable.

The functions header recognition, frame bit count and output voltage freeze are available only if extended control register function is enabled.

A further protection function is named UVLO (under voltage lock out), which turns off the device if the VCC voltage falls under 4V.

Hysteresis is 340 mV typically.

The device is also provided against thermal raising by turning off the PLI when the junction temperature exceeds 170° C.±10%.

Hysteresis is around 30° C.

When shutdown threshold is overcome, the PLI interface is switched OFF.

The thermal shutdown event is notified by the thermal sensor 76 to the host controller using the BU/THERM line.

When BU/THERM line is high, the device junction temperature exceeds the shutdown threshold (not latched). This function is enabled only in the transmission mode while in the receiving mode the BU/THERM pin is used for the band in use signaling.

Voltage Regulators

The IC device 100 has an embedded 5V linear regulator 35 that is externally available (on the pin VDC) to supply the application circuitry.

The 5V linear regulator 35 has a very low quiescent current (50 µA) and a current capability of 50 mA. The regulator 35 is protected against short circuitry events.

The VDD pin can act either as 3.3V voltage output or as input digital supply.

When the VDD pin is externally forced to 5V all the digital input/outputs operate at 5V, otherwise all the digital input/outputs are internally supplied at 3.3V.

The VDD pin can also source 3.3V voltage to supply external components. In this respect it is connected to the output of the regulator 30.

The 3.3V linear regulator 30 has a very low quiescent current (50 µA) and a current capability of 50 mA.

The regulator 30 is protected against short circuitry events.

To ensure the device proper power-up sequence, the VCC and VDD supplies fulfill the following rules:

1. VCC rising slope does not exceed 100V/ms.
2. When VDD is below 5V/3.3V: VCC-VDD<1.2V.

When the VDD supply is connected to VDC (5V Digital Supply) the above mentioned relation can be ignored if VDC load<50 mA and if the filtering capacitor on VDC<100 uF.

If VDD is not forced to 5V, the digital I/Os are internally supplied at 3.3 V and if VDD load<50 mA and the filtering capacitor on VDD<100 uF the second relation can be ignored.

Advantageously, the transceiver device 100 is protected by a packages having a lead-free second level interconnection.

The category of this second level interconnection is marked on the package and on the inner box label, in compliance with JEDEC Standard JESD97. The maximum ratings related to soldering conditions are also marked on the inner box label.

The new power line transceiver device 100 is a powerful signal amplifier combined with "stripped down" key features that are much improved over the similar devices of the state-of-the-art.

Reduced in size and pin count, this new transceiver enables the design of very compact home and building automation, such as easily integrating a complete PLC node in a socket or switch.

It is also ideal for "outdoor" applications, such as small street lighting controllers and cost effective Automatic Meter Reading (AMR) systems. Its high level of integration, and in particular its new power amplifier topology, significantly reduces the overall BOM (bill of materials) cost of such products.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transceiver, comprising:
an internal register;
a line driver configured to drive synchronous and asynchronous network communications over power lines, the line driver including a single-ended power amplifier with directly accessible input and output lines;
a header recognition block;
a frame length counter; and
a plurality of linear regulators configured to output different voltage levels to power a plurality of external controllers linked to the transceiver, wherein the register, line driver, header recognition block, frame length counter and regulators are integrated into a single chip and are structured to operate from a single supply voltage, and the chip is configured to selectively activate external controllers coupled to respective outputs of the plurality of linear voltage regulators.

2. The transceiver according to claim 1 wherein the chip is configured to activate said external controllers only when a message with at least one of a specific header and a specific frame length is detected.

3. The transceiver according to claim 1, further including a programmable automatic level control block configured to selectively freeze and an output level.

4. The transceiver according to claim 1, further comprising an automatic level control structured to automatically adapt transmission levels to a line impedance on the power lines.

5. The transceiver according to claim 1, further comprising a supply voltage terminal structured to receive the supply voltage, wherein the power amplifier has a supply input coupled to the supply voltage terminal and the linear regulators have respective supply inputs coupled to the supply voltage terminal.

6. An electronic synchronous/asynchronous transceiver, comprising:
an internal register;
a supply voltage terminal structured for connection to a supply voltage;
a line driver configured to drive network communications over power lines, the line driver including a single-ended power amplifier with directly accessible input and output lines, the power amplifier having a supply input coupled to the supply voltage terminal;
a programmable header recognition circuit portion and frame length counter; and
a plurality of linear regulators configured to provide different voltage levels to power different external controllers linked to the transceiver device, the linear regulators having respective supply inputs coupled to the supply voltage terminal, wherein the register, line driver, and regulators are integrated into a single chip and are structured to operate from the supply voltage, and the chip is configured to selectively activate external controllers coupled to respective outputs of the plurality of linear regulators.

7. The transceiver according to claim 6 wherein the programmable header recognition circuit portion and frame length counter is configured to activate said external controllers only when a message with at least one of a specific header and frame length is detected.

8. The transceiver according to claim 6, further including a programmable automatic level control block configured to selectively freeze an output level in noisy environments.

9. The transceiver according to claim 6, further comprising an automatic level control structured to automatically adapt transmission levels to a line impedance on the power lines.

10. An integrated circuit chip, comprising:
a programmable control register;
a serial interface coupled to the control register;
a single-ended power amplifier with a plurality of inputs coupled to respective inputs of the chip and an output coupled to an output of the chip;
a header recognition block; and
a frame length counter; and
a plurality of linear voltage regulators having outputs coupled to respective outputs of the chip, wherein the register, the line driver and the linear voltage regulators are coupled to a common voltage supply line of the chip and the chip is configured to selectively activate external controllers coupled to respective outputs of the plurality of linear voltage regulators.

11. The integrated circuit chip of claim 10
wherein the chip is configured to selectively activate external controllers coupled to respective outputs of the plurality of linear voltage regulators when a message with at least one of a specific header and frame length is detected.

12. The integrated circuit chip of claim 10, further comprising:
an automatic level control block.

13. A system, comprising:
an integrated circuit chip, including:
a programmable control register;
a serial interface coupled to the control register;
a single-ended power amplifier with a plurality of inputs coupled to respective inputs of the chip and an output coupled to an output of the chip;
a header recognition block;
a frame length counter; and
a plurality of linear voltage regulators having outputs coupled to respective outputs of the chip, wherein the register, the serial interface, the power amplifier and the linear voltage regulators are coupled to a common voltage supply line of the chip; and
a plurality of external devices coupled to respective outputs of the plurality of linear voltage regulators, wherein the external devices comprise external controllers and the integrated circuit chip is configured to selectively activate the external controllers.

14. The system of claim 13, comprising:
one or more external filter components coupled to the single-ended power amplifier.

15. The system of claim 14 wherein at least one of the one or more external filter components is one of the plurality of external devices.

16. The system of claim 13 wherein,
the integrated circuit chip is configured to selectively activate an external controllers when a message with a specific header is detected.

17. The system of claim 13 wherein the integrated circuit chip includes an automatic level control block.

18. A system, comprising:
an integrated circuit chip, including:
a single-ended power amplifier with a plurality of inputs coupled to respective inputs of the chip and an output coupled to an output of the chip;
a plurality of linear voltage regulators having outputs coupled to respective outputs of the chip; and means for controlling synchronous and asynchronous power line communications, wherein the power amplifier, the linear voltage regulators and the means for controlling are coupled to a common voltage supply line of the chip; and a plurality of external devices coupled to respective outputs of the plurality of linear voltage regulators, wherein the means for controlling includes means for recognizing headers and frame lengths and is configured to selectively activate the external devices.

19. The system of claim 18 wherein the plurality of external devices comprise a plurality of external controllers.

20. The system of claim 18, further comprising:
one or more external filter components coupled to the single-ended power amplifier.

21. The system of claim 18 wherein the means for controlling comprises:
a header recognition block; and
a frame length counter.

22. The system of claim 18 wherein the means for controlling includes a control register and an automatic level control block.

* * * * *

UNITED STATES PATENT AND TRADEMARK OFFICE
CERTIFICATE OF CORRECTION

| | | |
|---|---|---|
| PATENT NO. | : 8,208,518 B2 | Page 1 of 1 |
| APPLICATION NO. | : 12/211731 | |
| DATED | : June 26, 2012 | |
| INVENTOR(S) | : Roberto Cappelletti et al. | |

It is certified that error appears in the above-identified patent and that said Letters Patent is hereby corrected as shown below:

Column 15, Line 28:
"selectively freeze and an output level." should read, --selectively freeze an output level.--.

Signed and Sealed this
Sixth Day of November, 2012

David J. Kappos
*Director of the United States Patent and Trademark Office*